(12) United States Patent
Hillen

(10) Patent No.: US 11,269,350 B2
(45) Date of Patent: Mar. 8, 2022

(54) METHOD FOR CREATING AN ENVIRONMENT MAP FOR A PROCESSING UNIT

(71) Applicant: Vorwerk & Co. Interholding GmbH, Wuppertal (DE)

(72) Inventor: Lorenz Hillen, Wuppertal (DE)

(73) Assignee: Vorwerk & Co. Interholding GmbH, Wuppertal (DE)

(*) Notice: Subject to any disclaimer, the term of this patent is extended or adjusted under 35 U.S.C. 154(b) by 124 days.

(21) Appl. No.: 16/470,630

(22) PCT Filed: Dec. 11, 2017

(86) PCT No.: PCT/EP2017/082142
§ 371 (c)(1),
(2) Date: Jun. 18, 2019

(87) PCT Pub. No.: WO2018/114412
PCT Pub. Date: Jun. 28, 2018

(65) Prior Publication Data
US 2019/0324473 A1    Oct. 24, 2019

(30) Foreign Application Priority Data
Dec. 19, 2016  (DE) .................... 10 2016 124 856.8

(51) Int. Cl.
*G05D 1/02*     (2020.01)

(52) U.S. Cl.
CPC ......... *G05D 1/0274* (2013.01); *G05D 1/0219* (2013.01); *G05D 1/0246* (2013.01); *G05D 2201/0203* (2013.01)

(58) Field of Classification Search
CPC .. G05D 1/0274; G05D 1/0219; G05D 1/0246; G05D 2201/0203
See application file for complete search history.

(56) References Cited

U.S. PATENT DOCUMENTS

2011/0202175 A1* 8/2011 Romanov .................. B25J 5/00
                                                                700/250
2014/0324271 A1* 10/2014 Oh ....................... G05D 1/0274
                                                                701/28

(Continued)

FOREIGN PATENT DOCUMENTS

DE    10 2008 014 912 A1   9/2009
WO       2016/085240 A1    6/2016

OTHER PUBLICATIONS

International Search Report of PCT/EP2017/082142, dated Feb. 20, 2018.

(Continued)

*Primary Examiner* — Rodney A Butler
(74) *Attorney, Agent, or Firm* — Collard & Roe, P.C.

(57) ABSTRACT

A method for creating an environment map for a processing unit, which moves independently within an environment, wherein a detection device detects environmental features and/or objects within the environment, and wherein position data of the environmental features and/or objects are processed by an evaluation device into an environment map. In order to achieve intuitive user-processing unit interaction, the detected environmental features and/or objects are processed via 3D reconstruction into a photo-realistic, three-dimensional environment card.

8 Claims, 4 Drawing Sheets

(56) References Cited

U.S. PATENT DOCUMENTS

2015/0032260 A1\* 1/2015 Yoon .................. A47L 11/4011
700/257
2016/0144505 A1 5/2016 Fong et al.

OTHER PUBLICATIONS

Benjamin Pitzer: "Automatic Reconstruction of Textured 3D Models," Feb. 22, 2011, XP055445480, Retrieved from the Internet: URL: https://www.ksp.kit.edu/download/1000025619, [retrieved on Jan. 29, 2018].

\* cited by examiner

Fig. 3
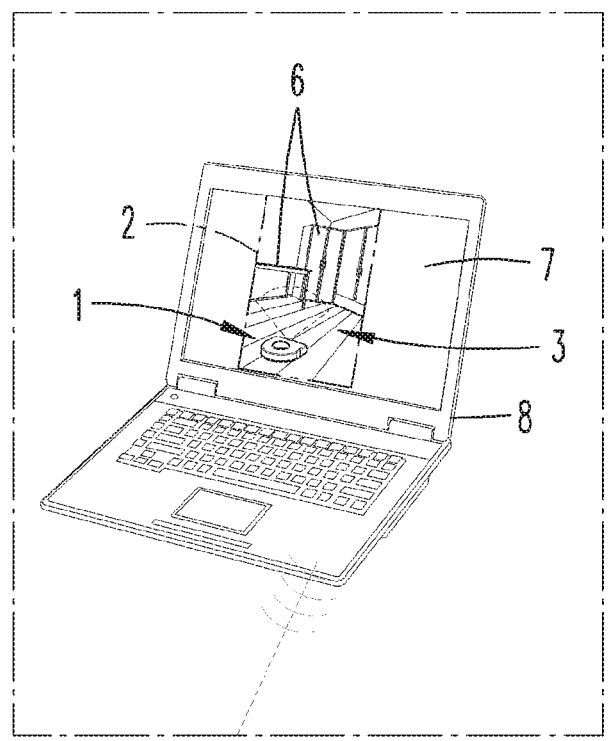
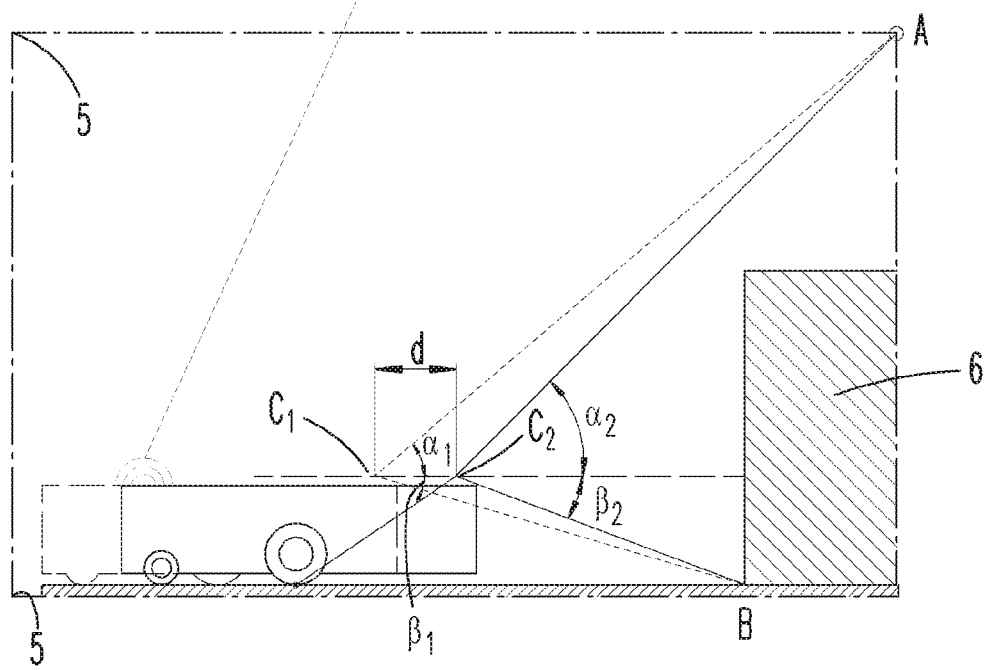

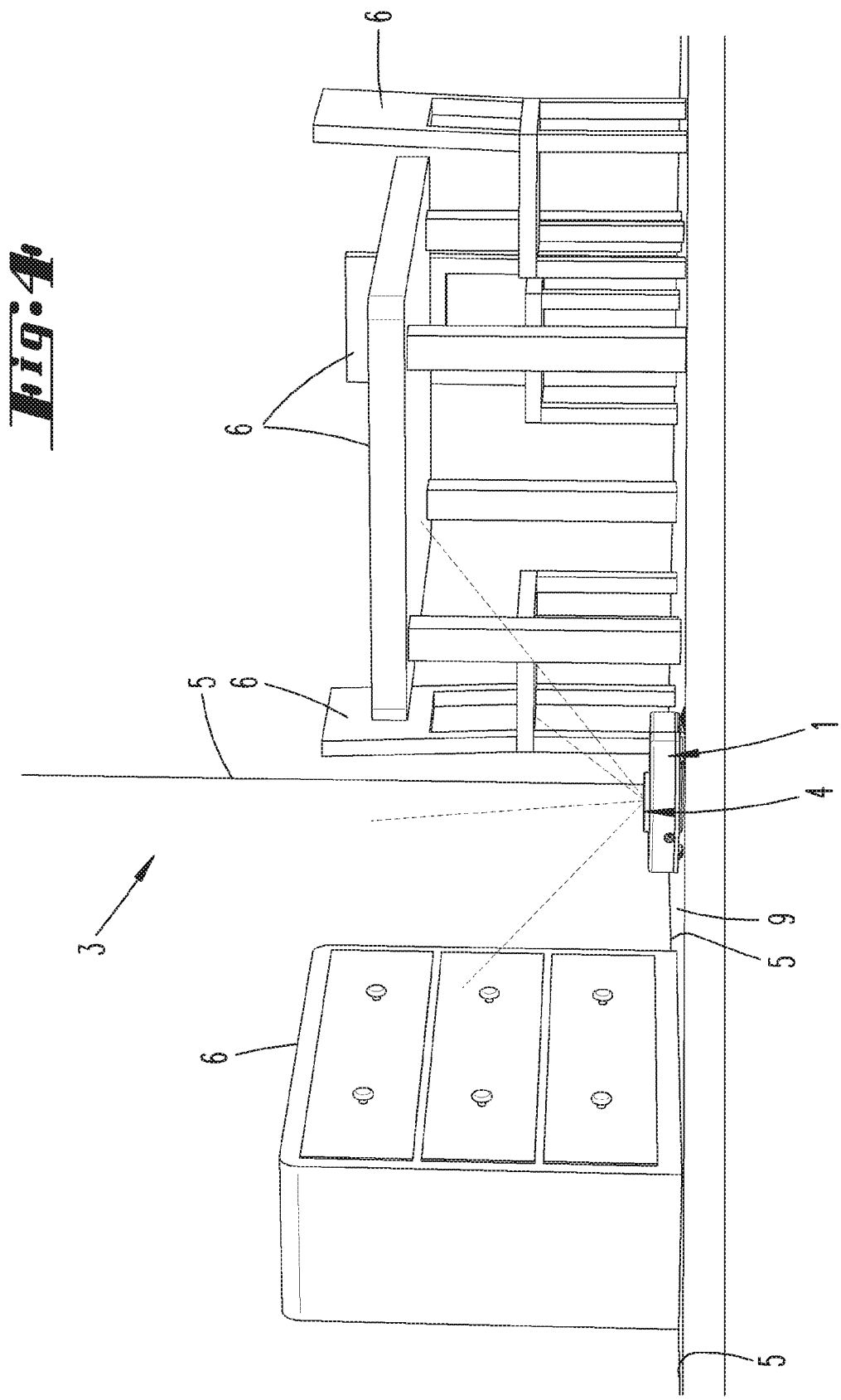

METHOD FOR CREATING AN ENVIRONMENT MAP FOR A PROCESSING UNIT

CROSS REFERENCE TO RELATED APPLICATIONS

This application is the National Stage of PCT/EP2017/082142 filed on Dec. 11, 2017, which claims priority under 35 U.S.C. § 119 of German Application No. 10 2016 124 856.8 filed on December 19, 2016, the disclosures of which are incorporated by reference. The international application under PCT article 21(2) was not published in English.

FIELD OF TECHNOLOGY

The invention relates to a method for operating a processing device used for cleaning a floor surface, which travels automatically within an environment according to a preprogrammed traveling and processing strategy, wherein a detection device detects environment features and/or objects within the environment, and wherein position data of the environment features and/or objects are processed by an evaluation device into an environment map.

PRIOR ART

Methods of the kind mentioned above are known in prior art. For example, a processing device used for cleaning a floor surface travels automatically according to a preprogrammed traveling and, if necessary, processing strategy within the environment, for example within a home or the like. Likewise known in this conjunction is for the processing device to have an environment map of the home, possibly several environment maps for several rooms in the home. The environment map is preferably stored in a data memory of the processing device or an external device. The environment map includes position data of objects, for example of obstacles and/or furniture, partition walls and the like.

Known for generating the environment map is to allow the processing device to travel through the environment within the framework of a learn trip. However, the environment map can likewise also be generated or at least supplemented during a processing run of the processing device.

Various detection devices for detecting the environment are known in prior art. For example, DE 10 2008 014 912 discloses a processing device with an all-round scanner. Detection is based upon an optical triangulation process, which measures distances to objects.

Further known from prior art is to generate environment maps from images pieced together like a mosaic, which are recorded by means of a camera arranged on the processing device.

For example, the environment map can be put together using the data recorded by means of the detection device based on known methods of visual SLAM (simultaneous localization and mapping). Newly recorded data of the detection device are here used to localize the processing device in the environment map on the one hand, and expand or improve the existing environment map on the other.

Even though an environment map can be generated with the known method, it is in part difficult for a user to read. This is because the environment of the processing device is often displayed as a 2D grid map. This grid map is a very simplified, schematic depiction of the environment, and resembles a floor plan of a room. The latter typically exclusively contains information recorded within a horizontal detection plane corresponding to the working height of the processing device, and also does not distinguish between environment features, such as wall-floor transitions, and objects, such as items of furniture. Objects with floor clearance, such as beds, tables or chairs, are typically not recorded on the environment map in their entirety, but rather only areas like table legs that lie in the detection plane. As a consequence, the known grid maps are less intuitively graspable for a user overall, since they do not reflect human perception.

Additionally known from prior art, e.g., from the publication by Benjamin Pitzer: "Automatic Reconstruction of Textured 3D Models", Feb. 22, 2011, is to perform a 3D reconstruction and visualization of environments, to which end a self-propelled robot is used, which travels around within an environment, and uses a detection device to record environment features, which are further processed into an environment map, and subsequently used to put together a 3D model.

SUMMARY OF THE INVENTION

Therefore, the object of the invention is to develop a method for generating an environment map in which the generated environment map is easier for a user to read than the environment maps known in prior art.

In order to achieve the aforementioned object, the invention proposes that the detected environment features and/or objects in the environment be processed into a photorealistic, three-dimensional environment map through 3D reconstruction, wherein the environment features and/or objects are recorded during a movement by the processing device within the framework of a floor processing operation.

The photorealistic, 3D-reconstruction of the environment according to the invention now offers the user of the processing device an intuitive view of the environment, which contains more information than the two-dimensional environment maps previously generated in prior art, which were often kept schematic. As a result, the user can easily find his or her way in the environment map, follow the processing device and issue instructions to the latter for processing tasks. 3D reconstruction recovers depth information about the environment that had been lost while recording the environment features or objects. This eliminates a disadvantage that exists while detecting an environment feature or object in a scene of the environment. The generated photorealistic, three-dimensional environment map displays the environment to a user of the processing device in the same way that the user would directly perceive the environment with his or her own eyes. The perspective of the displayed environment here depends on the perspective with which the environment was recorded, i.e., possibly on a plane lying deeper than the usual bird's eye perspective top view the user has of objects within the environment. However, transitions between walls and room ceilings can also be depicted from a worm's eye view of a processing device, for example. The detection device can basically also be a separate device that can be displaced relative to the processing device, for example a camera of a mobile phone, tablet computer and the like. According to the invention, the environment features and/or objects are recorded during a movement of the processing device within the framework of a floor processing operation, for example vacuuming and/or mopping a floor surface. As a consequence, no separate detection run of the processing device is required for recording data to generate the environment map. In particular, the environment map can further be generated during a cleaning run of the processing device. In addition, it is also possible for the map be put together at some time after a processing activity of the processing device, for example if the processing device is located at a base station for charging purposes. At the end of the respective run, the processing device has preferably mapped out the entire accessible environment, and calculated a corresponding 3D-model, with which the user can interact or which serves as a starting point for other applications.

For example, environment features are intended to mean transitions between walls, floors and ceilings of a room. The term object is first and foremost understood as an obstacle, for example a piece of furniture, which blocks a movement route for the processing device.

It is proposed that environment features and/or objects, in particular object points and/or object surfaces, be recorded in chronological sequence from differing perspectives of the detection device, wherein the environment map is reconstructed from the sequential recordings. During a movement by the detection device, data are recorded at chronological intervals, for example specifically camera images or distance data of a distance measuring device. The chronological and/or spatial distances between sequential recordings are known, wherein the recordings can especially preferably take place at regular intervals, wherein the regularity can relate to either a chronological component or a distance component of a movement by the detection device. A three-dimensional position of the environment feature and/or the object in the environment can then be calculated out of two sequential recordings given knowledge of a stretch covered by the detection device, in particular a traveled distance of the processing device, between two recordings, for example camera images. The spatial distances can here be calculated by an odometry device of the processing device, for example. The position can be estimated not just for environment features, for example corners or other wall-floor or wall-ceiling transitions, but also for surfaces. The surfaces can be represented as a point cloud or primitive surface, for example a rectangle or triangle. It is conceivable for a map to be constructed with point clouds, which are converted into primitive surfaces in a subsequent processing step. This makes it possible to reduce the amount of data that has to be processed.

The environment map can be generated according to known methods for visual SLAM (simultaneous localization and mapping), wherein algorithms are used for processing point clouds and/or primitive surfaces. Depending on the type of used map representation, the SLAM algorithms share in common that the data recorded by means of the detection device are here used on the one hand to generate, expand or improve an environment map, and on the other to simultaneously localize the processing device within the environment map. As a rule, newly recorded data are fused with the already existing data of an environment map with the help of probability estimating methods or optimization methods. As a whole, then, chronologically and/or spatially deviating recordings of the detection device can be used to calculate a position in relation to a world coordinate system for each environment feature and/or object of the environment. In particular, object points and/or object surfaces receive a specific point of the world coordinate system.

It is proposed that the detection device be a camera, which records images of the environment. In an especially simple case, the detection device can be a unidirectional camera, which is installed on the processing device (or also in another mobile device). Alternatively, images of the environment can also be recorded by means of an omnidirectional camera system, i.e., by means of a camera system with a distinctly larger visual field than unidirectional cameras. For example, such a camera system can be a panoramic camera system with a horizontal visual field of 360 degrees, or a camera system with fisheye lenses, which have a visual field of 180 degrees and more in opposite directions. In addition, a stereo camera system can be used, in which two cameras are arranged side by side, or a depth camera, often referred to as an RGB-D camera, in which a stereo calculation takes place by projecting a known dot pattern. Likewise, use can also be made of a camera pointing at the ceiling. Several optical systems or detection devices are especially preferably combined with each other.

Alternatively or additionally to using a camera as the detection device, use can also be made of a laser distance sensor, which especially preferably acquires data not just in a plane, but by pivoting in a plurality of planes. In addition, information from image sensors and distance sensors can also be fused together, for example by combining data from a camera and data from a distance measuring device, for example a laser rangefinder.

It can be provided that the detected environment features and/or objects for generating the environment map be processed in an external device, in particular in a mobile device and/or a server. The calculations required for generating the environment map can thus be performed not just by a separate onboard computer of the processing device, but alternatively also by an external server, i.e., a cloud, or by means of a computer of a mobile terminal, for example a mobile phone, a laptop, a tablet computer or the like. Also conceivable are partial solutions, in which the calculations are performed in part on the processing device itself, and in part on an external device, like a server. For example, a SLAM method based on point clouds on the processing device can be implemented, while the map representation is converted into primitive surfaces on a server. Given an at least partial external calculation, the detected environment features and/or objects or data already calculated therefrom are transmitted as a quantity of data over a preferably wireless network connection to an external device, which then performs the calculations.

It is proposed that the environment map be shown on a display of an external device, in particular a mobile device. As a consequence, the environment map and user interaction can be visualized on a device other than the processing device itself. Recommended in particular is visualization on the display of a mobile terminal. For example, the environment map can [be visualized] on the display of a mobile telephone, laptop, tablet computer, television, food processor and the like. However, it is also conceivable that the environment map be shown on the display of the processing device in conjunction with corresponding operating elements of the processing device. The latter case eliminates the need for data processing via a network. The environment map can already be displayed while building up the map, and/or only once a movement by the processing device within the environment has ended.

It can be provided that at least one partial area of the displayed environment map and/or an object displayed in the environment map can be rotated, magnified and/or shifted. As a result, a user can modify the view of the environment map, for example in such a way as to change a perspective, magnify and/or shift a view and the like. For example, the view on an object can also be varied so that the perspective from which the object is displayed reflects a current view of the user in the environment. Alternatively, an object in the environment map, or the entire displayed environment map, can be rotated in such a way that the view reflects a current direction of movement of the processing device.

It can further be provided that a user of the processing device allocate a name and/or a color code and/or a symbol to a room and/or partial area of a room and/or an object present in the environment map, which can be integrated in control commands for controlling a movement of the processing device. This makes it easier for the user of the processing device to orient themselves in the environment map. For example, rooms in a home can be labeled by allocating colors and/or names, for example the name "kitchen" and a red coloration. As an alternative to individual rooms, only individual areas of a room can be named in the same way, for example given the name "dog nook" and the color brown. In addition, specific objects can be marked by assigning a name, for example the name "sofa", "bed", etc. Furthermore, the current position of the processing device in the environment map can be displayed. This is easy to do, for example by displaying a symbol like a point or flag to represent the processing device. A 3D model of the processing device in the environment map show more complicated illustrations. Based upon the names and/or color codes and/or symbols, functions for interacting with the processing device can be implemented. For example, an allocated name and/or an allocated color code can be named for selecting a starting point or a position in the environment which the processing device is to approach. For example, a position of a base station within the environment map can be selected for sending the processing device there for charging an accumulator. Defined rooms or defined areas to be approached by the processing device can be selected, for example through commands like "clean the living room" or "clean the dog nook". In addition, areas not linked with a name or color code can be selected through marking, for example for spot cleaning. It is likewise possible to select areas or rooms in the environment map that are not to be processed and traversed, are not to be processed but can be traversed, or are to be processed especially intensively or with specific processing parameters.

If the processing device uses an environment map for navigation other than the one shown to the user on the display for user interaction, it must be ensured that a position selected by the user in the displayed environment map, for example, be correctly converted into the map used by the processing device. For example, such a conversion becomes necessary when the environment map shown to the user was heavily revised, for example by converting point clouds into primitive surfaces, outlier elimination, i.e., removal of erroneous measuring values/obstacle points, or adjustment of straight segments to a point cloud.

It can be provided that an object in the environment map be segmented and extracted from the environment map, wherein the extracted object and/or the environment map reduced by the extracted object is imported into a data processing program, and processed further by the latter. Proceeding from the 3D environment map, individual objects of the environment, for example individual pieces of furniture, can be segmented and extracted. For example, segmentation can be based upon additionally detecting a floor area, a ceiling and/or walls, for example a floor as a horizontal surface without elevation, a wall as a ceiling height, vertical surface and the like. In the following, the object is subtracted from the 3D environment map, i.e., removed. It is highly probable that the structures remaining behind in the 3D model are exclusively objects within the environment, for example which can be identified as pieces of furniture by searching for a plane parallel to a floor area at a suitable height, for example with a distance of approx. 80 cm to 120 cm. This makes it possible to identify objects such as tables, chairs, cabinets, shelves and numerous other pieces of furniture. For example, the user can then import the segmented objects into another 3D modeling program for further processing. For example, pieces of furniture can be removed from the environment to obtain a floor plan of a room or a home without pieces of furniture. For example, this floor plan can be used to be able to measure the room, to integrate another piece of furniture from a furniture database into the 3D model, to change how the home or room is furnished, to see how other furniture arrangements would look like, and so on. The user can upload the computed 3D model of the environment into a network and share it with other users. This can take place within the framework of suitable platforms, for example social media platforms like Facebook, special furnishing portals and the like. As an alternative, the processing device can also store an already computed 3D model as a reference, if necessary drawing upon an external device, server or the like. In order to detect changes in the environment, for example during a patrol run of the processing device, the processing device can compare its current detection device with the reference model. If implausible changes or moving objects are detected in the process, the processing device can output an alarm, for example by the user receiving a message on a mobile terminal device.

Finally, it is proposed that a current position of the processing device in the environment map be displayed. For example, this provides the user with information about the current position of the processing device within the environment when they are unable themselves to perceive the processing device, for example because the latter is located in a different room than the very user.

In addition to the method described above, the invention further relates to a processing device, specifically a processing device for cleaning a floor surface, which travels automatically within an environment according to a preprogrammed traveling and processing strategy, wherein the processing device has a motor-blower unit for sucking air loaded with suction material into the processing device through a suction mouth opening, and a detection device for detecting environment features and/or objects within the environment, wherein the processing device is designed to use an environment map containing position data of the environment features and/or objects to navigate within the environment, wherein the detection device is configured to record the environment features and/or objects during a movement of the processing device within the framework of a floor processing operation, and wherein the environment map is a photorealistic, three-dimensional environment map, in which the detected environment features and/or objects are processed through 3D reconstruction. The features and advantages of the processing device according to the invention, specifically a cleaning device for cleaning a floor surface, are as described in greater detail above in relation to the method according to the invention. In order to avoid repetition, reference thus made to the above explanations. As a consequence, the invention also relates to a floor processing device, specifically to a cleaning device, which is designed to implement a method according to the invention described above.

BRIEF DESCRIPTION OF THE DRAWINGS

The invention will be explained in greater detail below based upon exemplary embodiments. Shown on:

FIG. 3 is a processing device while measuring the environment, FIG. 4 is a photorealistic, three-dimensional environment map.

DESCRIPTION OF THE EMBODIMENTS

Figure 1:
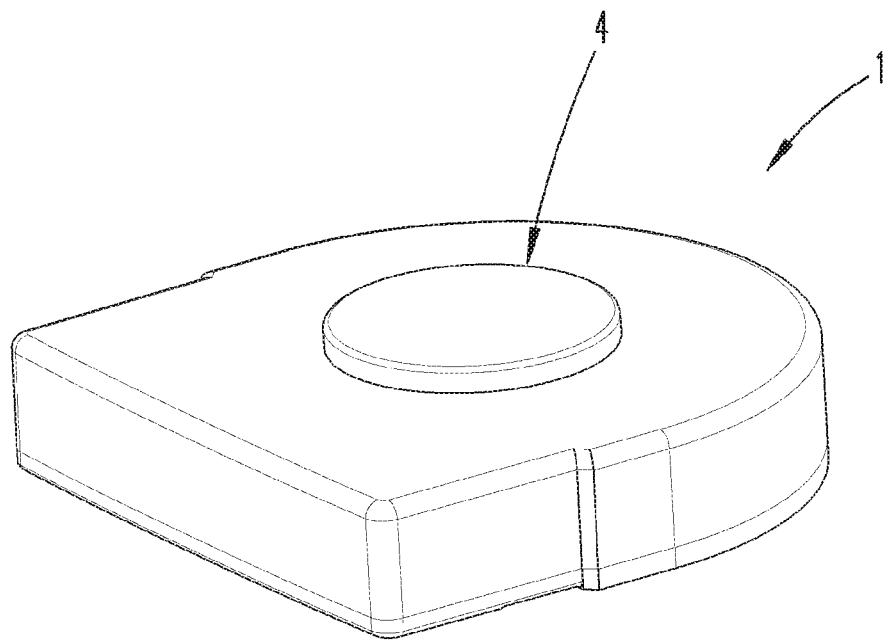
FIG. 1 is a perspective, exterior view of the processing device.

FIG. 1 shows an automatically moving processing device 1, which here is designed as a vacuuming robot. The processing device 1 has a detection device 4, which is arranged inside of the housing of the processing device 1. The detection device 4 is here a camera chip, for example a CMOS or CCD chip, which receives an image of an environment 3 via a mirror also arranged in the housing of the processing device 1. The detection device 4 is rotatably arranged inside the housing, for example here by 360 degrees, so that images of the environment can be recorded all around the processing device 1. As an alternative to designing the detection device 4 as a camera, the detection device 4 can also be designed as an optical triangulation measuring device or the like.

The processing device 1 can travel over a surface to be cleaned via traversing wheels (not shown). In addition, the bottom side of the processing device 1 facing the surface to be cleaned has electric motor-driven brushes (also not shown). In addition, the brush area of the processing device 1 has a suction mouth opening (not shown in any more detail) through which air loaded with suction material can be sucked into the processing device 1 by means of a motor-blower unit. The processing device 1 has a rechargeable accumulator for supplying electricity to the individual electrical components, for example for driving the traversing wheels and brushes and any other electronics provided beyond that.

The images of the environment 3 recorded by the detection device 4 can be combined into an environment map 2, wherein the map is put together according to known methods of visual SLAM (simultaneous localization and mapping).

Figure 2:
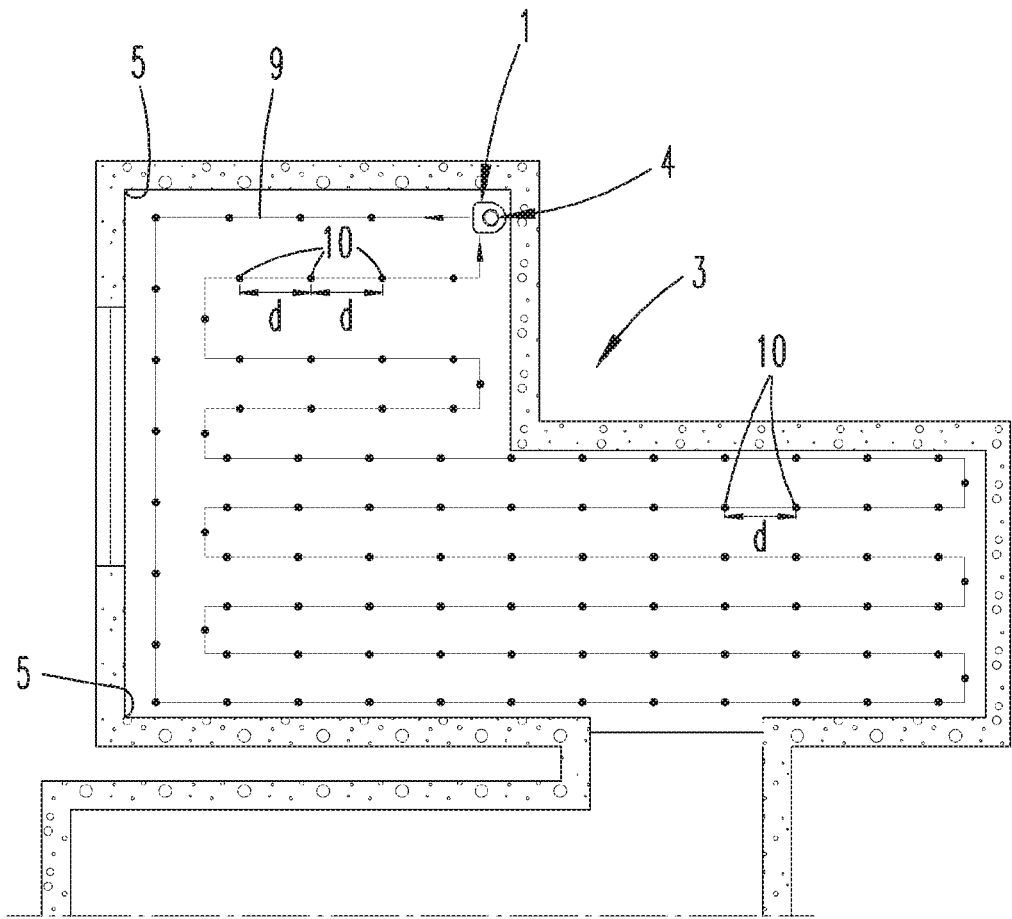
FIG. 2 is an environment in which a processing device travels along a movement route.

FIG. 2 shows an environment 3 of the processing device 1, which here is a partial area of a home, within which the processing device 1 can automatically move. The processing device 1 travels through the environment 3 along a movement route 9, wherein the movement route 9 has a plurality of measuring locations 10 spaced equidistantly apart, at which the detection device 4 records environment features 5 and/or objects 6 of the environment 3. A traveling distance d between two measuring locations 10 of the movement route 9 can be estimated through odometry, so that the current position of the processing device 1 within the environment 3 can also be extrapolated at all times. During the movement of the processing device 1, images of the environment 3 are recorded in the described distances. From a respective two sequential images, object points A, B or objects 6 and/or environment features 5 are then provided with coordinates of a world coordinate system.

FIG. 3 shows a detection of environment features 5 for the example of a wall-ceiling transition, which has an object point A, and for the example of an object 6 close to the floor, which has an object point B. The positions of the object points A and B within a world coordinate system can be calculated by initially recording a camera image at two sequential measuring locations 10. A position estimate for the measuring locations 10 can be performed via a localization process in an already created environment map 2. Such a method is required anyway for navigation of the processing device 1 within the environment 3. An estimate for the interval covered by the processing device 1 between two sequential measuring locations 10 is calculated via odometry or vector subtraction between the sequential measuring locations 10 along the movement route 9. The object points A, B in relation to the current position of the detection device 4 corresponding to the respective measuring locations 10 can be calculated from the distance between the measuring locations 10, a respective detection starting point $C_1$, $C_2$ of the detection device 4, and two angles $\alpha_1$ and $\alpha_2$ for the object point A and two angles $\beta_1$ and $\beta_2$ for the object point B. Since the position of the detection device 4 on the processing device 1 is known, the position estimates of the object points A and B can be performed in relation to the measuring locations 10, and hence the world coordinate system.

A large plurality of object points A, B can be calculated in this way, thereby yielding a point cloud. This point cloud can then be converted into a three-dimensional representation of the environment 3, which consists of primitive surfaces, for example rectangles and triangles.

The calculations for generating the environment map 2 can basically be performed inside of the processing device 1 by means of an onboard computer. In the exemplary embodiment shown, however, the image data recorded by the detection device 4 are transmitted via wireless communication to an external device 8, here a laptop. The laptop is used to carry out both the SLAM process based upon point clouds and the conversion of point clouds into primitive surfaces from which the photorealistic, three-dimensional environment map 2 is finally created.

According to FIG. 3, the external device 8, specifically the laptop, has a display 7, which displays the generated environment map 2. The environment map 2 shows the processing device 1 itself on the one hand, as well as objects 6, here specifically pieces of furniture that are present within the environment 3. The environment map 2 can be shown on the display 7 of the device 8 even while the processing device 1 is moving through the environment 3. Once the movement of the processing device 1 has ended, the entire environment 3 traversed along the movement route 9 is mapped, and a corresponding 3D model is computed, with which the user can interact, and which can serve as the starting point for additional applications. The depicted photorealistic environment map 2 allows the user of the processing device 1 an intuitive orientation within the environment map 2, so that the user can find his or her way especially easily in the environment map 2, follow the processing device 1 and give the latter instructions.

FIG. 4 shows an environment map 2 of a room, which was generated based on varying perspectives of the processing device 1. This environment map 2 is a photorealistic, three-dimensional representation of the environment 3, which shows a plurality of objects 6, and also a current position of the processing device 1. Since the processing device 1 has an in part smaller height than the objects 6, i.e., here pieces of furniture, the environment map 2 contains a worm-s eye view of the environment.

The objects 6 depicted on the environment map 2 can be provided with names and/or color codes. For example, areas of the depicted room can here be named "dog nook" or the like. In addition, corresponding colors can be allocated, for example the color "brown" for the dog nook. The environment map 2 can be rotated, magnified or shifted on the display 7 of the device 8, so that the environment map 2 is oriented in the way that the user sees the respective room upon entering it. As an alternative to the depicted 3D model, the current position of the processing device 1 can be integrated into the environment map 2 as a point, flag or the like.

Building upon the aforementioned functions for generating the environment map 2, other functions can also be implemented for interacting with the processing device 1. For example, the locations within the depicted room to be specifically approached by the processing device 1 can be selected. For example, a command like "clean the dog nook" can be given.

Proceeding from the depicted 3D environment map, individual objects 6, for example pieces of furniture, can be segmented and extracted from the environment map. For example, segmentation and extraction can be based on initially detecting walls and floor areas as horizontal or vertical surfaces and subtracting them from the 3D model of the environment 3. It is highly probable that the structures remaining behind in the 3D model are objects 6 like pieces of furniture. The type of objects 6 can be identified, for example by searching for planes parallel to the floor area at a distance of approx. 80 cm to 120 cm. Similarly, search criteria can also be used for specific features of chairs, cabinets, shelves and the like. The user can then import the segmented objects 6 into a different 3D modeling program for further processing, for example into a program for varying an interior design or the like, to see what a different arrangement of furniture in a room would look like. The user can further share the computed 3D model of the environment with other users by uploading it to a generally accessible server of a social media platform.

REFERENCE LIST

1 Processing device
2 Environment map
3 Environment
4 Detection device
5 Environment feature
6 Object
7 Display
8 Device
9 Movement route
10 Measuring location
A Object point
B Object point
$C_1$ Detection starting point
$C_2$ Detection starting point
d Traveling distance
$\alpha_1$ Angle
$\alpha_2$ Angle
$\beta_1$ Angle
$\beta_2$ Angle

The invention claimed is:

1. A method for operating a processing device (1) used for cleaning a floor surface, which travels automatically within an environment (3) according to a preprogrammed traveling and processing strategy, comprising the steps of:
detecting with a detection device (4) environment features (5) and/or objects (6) lin the form of object points (A,B) within the environment (3),
converting position data of the environment features (5) and/or objects (6) in the form of the object points (A,B) with an evaluation device into an environment map (2),
processing the detected environment features (5) and/or objects (6) in the form of the object points (A,B) into the environment map to create a photorealistic, three-dimensional environment map (2) through 3D reconstruction,
recording the environment features (5) and/or objects (6) in the form of the object points (A,B) during a movement by the processing device (1) within the framework of a floor processing operation,
wherein the environment features (5) and/or objects (6) in the form of the object points (A,B), are recorded in chronological sequence from differing perspectives of the detection device (4), wherein the environment map (2) is reconstructed from the sequential recordings,
wherein the processing device (1) travels through the environment (3) along a movement route (9), wherein the movement route (9) has a plurality of measuring locations (10) spaced equidistantly apart, at which the detection device (4) records the object points (A, B) of the environment (3),
wherein from a respective two sequential images, the object points (A, B), are then provided with coordinates of a world coordinate system, thereby yielding a point cloud and converting the point cloud into the three-dimensional environment map (2) as a three-dimensional representation of the environment (3), which consists of primitive surfaces,
displaying the environment map (2) on a display (7) of an external device (8), and
allocating a name to a room and/or one of the objects (6) present in the environment map (2) by a user of the processing device, which name identifies the room, and/or object and is integrated in control commands for controlling a movement of the processing device (1), wherein the environment map contains the allocated name such that the rooms or objects on the environment map are provided with names, and wherein the user selects a room and/or object to be approached and cleaned by the processing device through a command that states a cleaning instruction and the name of the selected room and/or object.

2. The method according to claim 1, wherein the environment features (5) and/or objects (6) are recorded in chronological sequence from differing perspectives of the detection device (4), wherein the environment map (2) is reconstructed from the sequential recordings.

3. The method according claim 1, wherein the detection device (4) is a camera, which records images of the environment (3).

4. The method according to claim 1, wherein the detected environment features (5) and/or objects (6) are processed in the external device (8) to generate the environment map (2).

5. The method according to claim 1, wherein at least one partial area of the displayed environment map (2) and/or one of the objects (6) displayed in the environment map (2) is rotated, magnified and/or shifted.

6. The method according to claim 1, wherein one of the objects (6) in the environment map (2) is segmented and extracted from the environment map (2), wherein the extracted object (6) and/or the environment map (2) reduced by the extracted object (6) is imported into a data processing program, and processed further by the data processing program.

7. The method according to claim 1, wherein a current position of the processing device (1) in the environment map (2) is displayed.

8. A processing device in the form of a cleaning device for cleaning a floor surface, which travels automatically within an environment according to a preprogrammed traveling and processing strategy, the processing device comprising:
- a motor-blower unit for sucking air loaded with suction material into the processing device (1) through a suction mouth opening, and
- a detection device (4) for detecting environment features (5) and/or objects (6) in the form of object points (A,B) within the environment,
- wherein the processing device (1) is designed to use an environment map (2) containing position data of the environment features (5) and/or objects (6) in the form of the object points (A,B) to navigate within the environment,
- wherein the detection device (4) is configured to record the environment features (5) and/or objects (6) in the form of the object points (A,B) during a movement of the processing device (1) within the framework of a floor processing operation,
- wherein the environment map (2) is a photorealistic, three-dimensional environment map (2), in which the detected environment features (5) and/or objects (6) in the form of the object points (A,B) are processed through 3D reconstruction,
- wherein the environment features (5) and/or objects (6) in the form of the object points (A,B), are recorded in chronological sequence from differing perspectives of the detection device (4), wherein the environment map (2) is reconstructed from the sequential recordings,
- wherein the processing device (1) travels through the environment (3) along a movement route (9), wherein the movement route (9) has a plurality of measuring locations (10) spaced equidistantly apart, at which the detection device (4) records the object points (A, B) of the environment (3),
- wherein from a respective two sequential images, the object points (A, B), are then provided with coordinates of a world coordinate system, thereby yielding a point cloud and converting the point cloud into the three-dimensional environment map (2) as a three-dimensional representation of the environment (3), which consists of primitive surfaces, and
- wherein the environment map (2) is configured to be shown on a display (7) of an external device (8), and wherein the environment map is configured such that a user of the processing device (1) can allocate a name-to a room and/or one of the objects (6) present in the environment map (2) such that the environment map contains the allocated name, which name identifies the room, and/or object and is integrated in control commands for controlling a movement of the processing device (1), such that the rooms or objects on the environment map are provided with names, and wherein the user selects a room and/or object to be approached and cleaned by the processing device through a command that states a cleaning instruction and the name of the selected room and/or object.

* * * * *